Patented Aug. 8, 1950

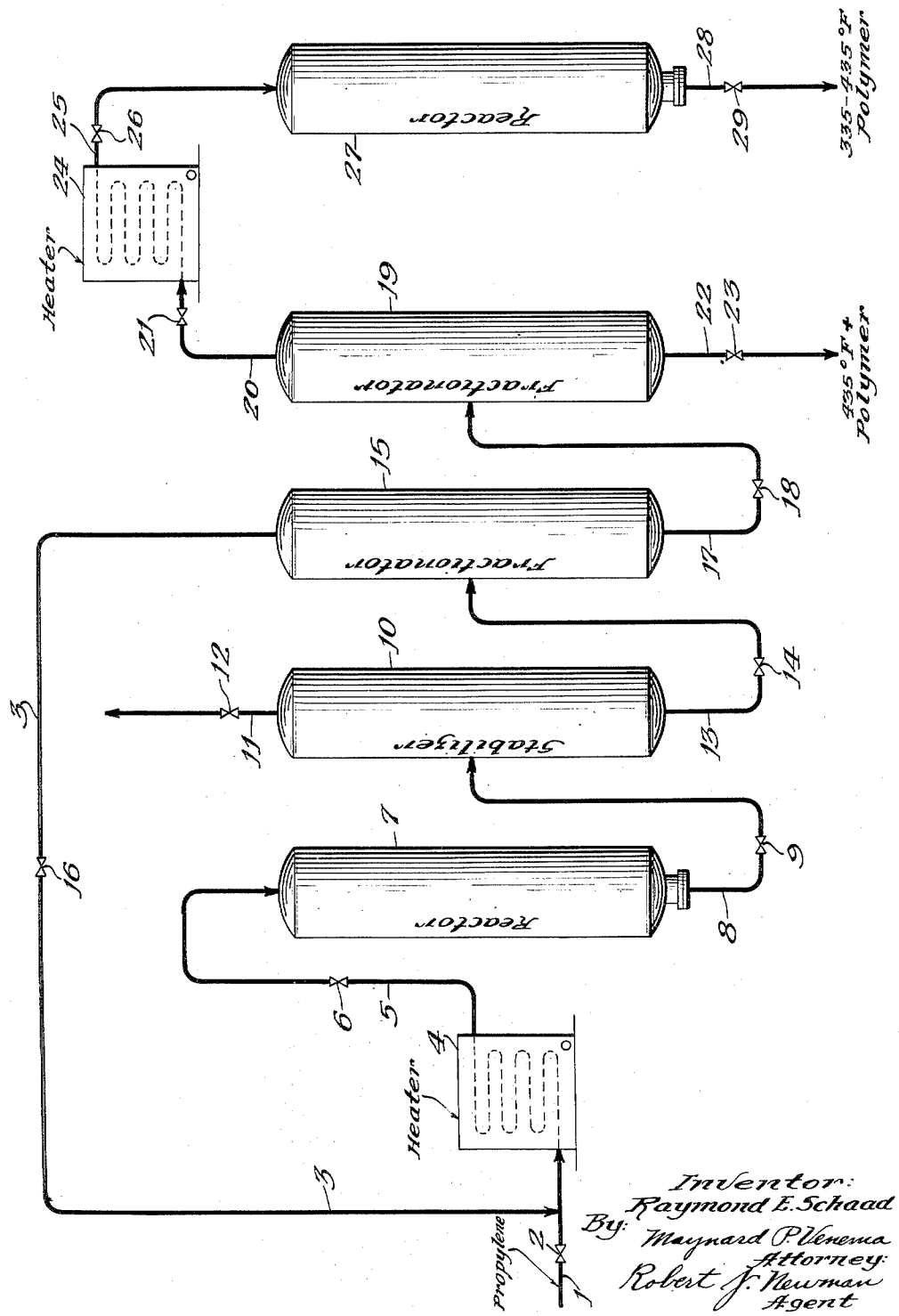

2,517,720

UNITED STATES PATENT OFFICE 2,517,720

METHOD OF PRODUCING PROPYLENE POLYMERS AND SURFACE ACTIVE AGENTS DERIVED FROM SAID POLYMERS

Raymond E. Schaad, Riverside, Ill., assignor to Universal Oil Products Company, Chicago, Ill., a corporation of Delaware Application December 22, 1947, Serial No. 793,254

9 Claims. (Cl. 260—505)

This invention relates to the production of olefinic polymers. It is particularly concerned with a method of producing propylene polymers that are especially useful for the alkylation of aromatic compounds and with surface active agents of the alkyl aryl sulfonate type produced from such alkylated aromatic compounds.

Effective detergents and wetting agents of the alkyl aryl sulfonate type have been developed in recent years. This type of material usually contains a relatively straight-chain alkyl group of from about 10 to about 18 carbon atoms attached to an aromatic nucleus, and a sulfonate salt radical, the cation of which may be metallic or non-metallic depending upon whether it is derived from an inorganic base or an organic nitrogen-containing base. This class of surface active agents is produced by alkylating an aromatic compound, usually a benzene hydrocarbon containing less than 10 carbon atoms per molecule such as benzene, toluene, xylene, ethyl benzene, or methylethyl benzene, with a suitable olefinic hydrocarbon containing the requisite number of carbon atoms per molecule, sulfonating the resultant alkyl aryl hydrocarbon, and neutralizing the sulfonic acid thereby formed with an organic nitrogen-containing base or an inorganic alkali. Certain polymers, particularly those of propylene, are especially suitable for use as alkylating agents in the preparation of surface active agents of this type. Propylene polymers of suitable boiling range, particularly the tetramer fraction, are desirable because they resist fragmentation and depolymerization during the alkylation reaction and because they impart desirable properties to the final detergent. The propylene polymers ordinarily are made by polymerizing propylene in the presence of solid phosphorus-containing polymerization catalysts such as a precalcined composite of a phosphoric acid and a siliceous adsorbent. It has been found, however, that the polymerization conditions that result in optimum yields are different from the polymerization conditions that result in optimum quality with respect to detergent production. In other words, when operating conditions are employed to maximize the yield of polymers, the resulting detergent made from such polymers possesses less washing power and desirable characteristics than the polymers made at certain other conditions. I have invented a process whereby propylene is converted in maximum yields to its tetramer and the tetramer is subjected to further reaction to increase its effectiveness as a component of surface active agents of the type described.

In one embodiment my invention relates to a process which comprises subjecting a mixture of propylene and a propylene polymer fraction, the components of which contain less than about 12 carbon atoms per molecule, to the action of a solid phosphorus-containing polymerization catalyst at a temperature of from about 250° F. to about 350° F. and a pressure of from about 100 to about 2,000 pounds per square inch, said mixture containing less than about 0.035 mol percent water, recovering from the resultant product a polymer fraction, the components of which contain at least about 12 carbon atoms per molecule, and contacting the last-named fraction with a phosphorus-containing polymerization catalyst at a temperature of from about 350° F. to about 500° F. and a pressure at least equal to atmospheric pressure.

In a more specific embodiment my invention relates to a process which comprises subjecting a mixture comprising propylene and a recycle fraction, produced as hereinafter described, in a ratio of from about 0.2 to about 5.0 liquid volumes of recycle per liquid volume of propylene, to polymerization in the presence of a solid phosphorus-containing polymerization catalyst at a temperature of from about 250° F. to about 350° F., a pressure of from about 100 to about 2,000 pounds per square inch, and a liquid hourly space velocity, based on the propylene, of from about 0.1 to about 5.0, said mixture containing less than about 0.035 mol percent water, fractionally distilling the resultant product to separate a fraction boiling from about 335° F. to about 435° F. and a lighter polymer fraction, the components of which contain less than about 12 carbon atoms per molecule, recycling said lighter polymer fraction to the aforementioned polymerization step, and contacting the 335–435° F. fraction with a phosphorus-containing polymerization catalyst at a temperature of from about 350° F. to about 500° F., a pressure at least equal to atmospheric pressure, and a liquid hourly space velocity of from about 0.1 to about 10.0.

In another embodiment my invention relates to a surface active agent comprising a water-soluble salt of a monosulfonated alkylated aromatic compound obtained by alkylating a monocyclic aromatic compound of less than 10 carbon atoms with propylene polymers produced by subjecting a mixture of propylene and a propylene polymer fraction, the components of which contain less than about 12 carbon atoms per molecule, to the action of a solid phosphorus-containing polymerization catalyst at a temperature of from about 250° F. to about 350° F. and a pressure of from about 100 to about 2,000 pounds per square inch, said mixture containing less than about 0.035 mol per cent water, recovering from the resultant product a polymer fraction, the components of which contain at least about 12 carbon atoms per molecule, and contacting the last-named fraction with a phosphorus-containing polymerization catalyst at a temperature of from about 350° F. to about 500° F. and a pressure at least equal to atmospheric pressure.

It has been found that the yield of high boiling polymers, particularly tetramers, from propylene is improved by conducting the polymerization reaction in the presence of lower boiling polymers of propylene but in the substantial absence of water, when solid phosphorus-containing catalysts are employed. The detrimental effect of water upon the yield of polymer is contrary to the results obtained in the production of motor fuel of gasoline boiling range by the polymerization of propylene and propylene-butylene mixtures in the presence of similar catalysts. In the motor fuel operation, water or steam are continuously added to the charging stock at the inlet to the polymerization reactor in order to maintain the activity of the catalyst. In contrast thereto, it has now been found that decreasing the water content of the feed stock, when said feed stock contains propylene and propylene polymers containing less than about 12 carbon atoms per molecule, increases both the conversion per pass at a given set of operating conditions and the yield of $C_{12}$ and higher polymers based upon the amount of propylene converted. Best results are obtained when the water content of the charge stock is less than about 0.035 mol percent. These improved results with substantially anhydrous feed stocks are obtained in largest measure when the concentration of low boiling liquid polymers in the combined charge stock is comparatively high.

The highest yields of $C_{12}$ polymer are obtained from propylene and lower boiling propylene polymers when the polymerization temperature is within the range of from 250° F. to about 350° F. At temperatures below about 250° F. the catalyst life ordinarily is short because the catalyst tends to soften with resultant resistance to flow and increase in pressure drop through the catalyst bed. Above 350° C. the yield of tetramer decreases with increasing temperature.

Pressure favors the reaction, hence pressures up to about 2,000 pounds per square inch may be employed. Ordinarily the pressure will not be less than about 100 pounds per square inch.

The liquid hourly space velocity of the propylene, by which I mean the volumes of liquid propylene charged per hour to the polymerization step per volume of catalyst, should be within the range of from 0.1 to about 5.0.

Best results are obtained when the volumetric ratio of low boiling propylene polymer to propylene is within the range of from about 0.2 to about 5.0.

The treating step, wherein the propylene tetramer produced in the polymerization step is subjected to the action of a phosphorus-containing polymerization catalyst in order to enhance its quality as an alkylating agent, is conducted at a temperature of from about 35° F. to about 500° F. Usually the pressure should be at least atmospheric, but, since liquid phase operation is preferred, the pressure ordinarily will be somewhat higher than this value. The space velocity should lie within the range of from about 0.1 to about 10.

The catalysts that may be used in the process of this invention comprise those phosphorus-containing substances that catalyze the polymerization of propylene. Such catalysts include the acids of pentavalent phosphorus, particularly the ortho, pyro, tri, and tetra types although other acids of phosphorus may be used. Metaphosphoric acid possesses the lowest activity of this class of acids and its use generally is not contemplated. These acids may be used in a concentrated form containing up to about 20 percent of water, but preferably, they are composited with or deposited upon adsorbents or carriers of a predominantly siliceous character such as diatomaceous earth, an especially useful form of which is kieselguhr, and artificially prepared silica, or materials of the class of aluminum silicates such as fuller's earth, bentonite, montmorillonite, and acid treated clays.

Other catalysts suitable for use in effecting the process of the present invention comprise alkaline earth acid phosphates and, particularly, the monoalkaline earth acid phosphates, also termed the dihydrophosphates, of calcium, strontium, and barium. As an example of these salts, monocalcium phosphate is represented by the formula $Ca(H_2PO_4)_2 \cdot H_2O$ for the hydrated salt or as $Ca(H_2PO_4)_2$ when water of hydration is absent. An acid phosphate of an alkaline earth metal may be used as such or it may be composited with or deposited upon carriers or supporting materials such as silica, diatomaceous earth, alumina, silica-alumina composites, crushed porcelain, pumice, fire brick and so forth.

Additional catalysts suitable for use in effecting the process of this invention comprise cupric orthophosphate or a material formed by calcining hydrated cupric orthophosphate at a temperature generally within the range of from about 200° C. to about 400° C. The hydrated cupric orthophosphate, the corresponding anhydrous salt, or a copper phosphate with an intermediate degree of hydration is utilizable as a polymerization catalyst either as such or composited with a carrier such as silica, diatomaceous earth, etc. The addition to the catalyst, before final drying thereof, of free phosphoric acid may increase the polymerization activity of the resultant composite catalyst.

The reactions described herein also are catalyzed by materials containing as their active ingredient a salt or an acid salt of an acid of phosphorus and of a metal selected from the members of the right hand column of group II of the periodic table such as an ortho- or pyro- acid phosphate of magnesium or zinc.

The solid catalysts mentioned herein constitute a preferred class. One of the more desirable members of this class is the catalyst comprising a precalcined composite of phosphoric acid and a siliceous adsorbent.

Ordinarily the same type of catalyst will be used in the treating step that is employed in the polymerization step. However, if desired, the caltalysts in these two steps may be different, although they will be selected from the aforementioned materials.

The solid catalysts mentioned herein may be used in a finely divided state in a fluidized type of operation or in a moving bed operation. However, the preferred method of operation is of the fixed bed type, wherein the catalyst is disposed as a fixed bed within a reactor and the charge stock is passed therethrough at conversion conditions. One type of apparatus in which an operation of this sort may be conducted is illustrated in Figure I. For purposes of simplification, pumps, heat-exchangers, condensers, receivers and the like have not been shown in the drawing, but it is to be understood that they are to be employed wherever engineering skill dictates.

Referring now to the drawing, propylene or a propane-propylene fraction containing less than about 0.035 mol percent water, is passed through line 1 containing valve 2 and is joined by a stream of light propylene polymer containing less than about 12 carbon atoms per molecule, said stream entering line 1 through line 3. The volumetric ratio of recycle polymer to propylene in this example is 2:1.

The stream of combined hydrocarbons flows through heater 4 wherein the temperature of the hydrocarbons is raised to a value of from about 250° F. to about 350° F. The heated hydrocarbons are directed through line 5 containing valve 6 into reactor 7 containing one or more beds or sections of the polymerization catalyst comprising a precalcined composite of phosphoric acid and kieselguhr. The propylene and the lower boiling polymers undergo a reaction in this zone to form substantial yields of propylene tetramer and higher boiling propylene polymers.

The effluent from reactor 7 is passed through line 8 containing valve 9 and into stabilizer 10. Any propane that might be present in the charge to stabilizer 10 and any unconverted propylene is removed overhead through line 11 containing valve 12 and may be recycled to reactor 7 or sent to storage or otherwise disposed of.

The stabilized polymers are withdrawn from vessel 10 through line 13 containing valve 14 and are passed into fractionator 15 wherein propylene polymers containing less than about 12 carbon atoms per molecule and boiling up to about 335° F. at atmospheric pressure are removed overhead through line 3 containing valve 16 and are passed into line 1 from whence they are returned to reactor 7.

The $C_{12}$ and heavier polymers are withdrawn from fractionator 15 through line 17 containing valve 18 and are passed into fractionator 19. A fraction that boils within the range of from about 335° F. to 435° F. at atmospheric pressure is removed overhead from fractionator 19 through line 20 containing valve 21. The higher boiling polymers, i. e., boiling above about 435° F., are withdrawn from fractionator 19 through line 22 containing valve 23. The material flowing through line 20 is passed through heater 24 wherein the temperature is raised to a value within the range of from about 350° F. to about 500° F. The heated hydrocarbons are then passed through line 25 containing valve 26 and into reactor 27 which contains a bed of catalyst comprising a composite of phosphoric acid and a siliceous adsorbent. Treated hydrocarbons, still boiling in the range of from about 335° to about 435° F., are withdrawn from reactor 27 through line 28 containing valve 29.

The treated polymer fraction withdrawn from reactor 28 may be utilized as an alkylating agent from the alkylation of a suitable aromatic compound such as benzene, toluene, or phenol. The resulting alkylated aromatic may then be monosulfonated and neutralized with a suitable base in order to prepare a superior surface active agent.

The following examples are given to illustrate my invention but they are not introduced for the purpose of unduly limiting the generally broad scope of said invention.

*Example I*

Two runs were made in which a substantially dry hydrocarbon fraction containing 0.2 mol percent ethylene, 3.0% ethane, 33.3% propylene, 63.1% propane, 0.1% butylenes, and 0.3% butane was commingled with propylene polymers boiling between about 100° F. and 350° F. The commingled mixture was then subjected to the action of a calcined composite of phosphoric acid and diatomaceous earth in the form of 5×5 mm. cylindrical pellets at two different polymerization temperatures. The operating conditions and results are shown in the following table:

| Run No | 1 | 2 |
|---|---|---|
| Duration of Test, Hours | 24 | 29 |
| Processing Conditions: | | |
| Reactor Preheater Outlet, Temperature °F | 266 | 390 |
| Reactor Peak Temperature, °F | 300 | 399 |
| Reactor Pressure, pounds | 750 | 760 |
| Combined Feed Ratio (Volumetric) | 2.13 | 1.94 |
| Liquid Hourly Space Velocity, Fresh Feed | 0.36 | 0.50 |
| Liquid Hourly Space Velocity, Combined Feed | 0.77 | 0.98 |
| BPD [1] Fresh Feed per 1000 pounds, Catalyst | 26.6 | 36.7 |
| BPD [1] Propylene per 1000 pounds Catalyst | 8.2 | 10.6 |
| Mol Per Cent Water in Combined Feed | 0.03 | 0.03 |
| Yields of Polymers, 350-410° F. Fraction: | | |
| Pounds/Pound of Propylene Charged | 0.66 | 0.45 |
| Pounds/Pound of Propylene Converted | 0.83 | 0.52 |
| Volume Per Cent of Propylene Charged | 44.7 | 30.4 |
| Pounds/Hour/Pound of Catalyst | 0.036 | 0.031 |
| Total Net Polymer Products: | | |
| I. B. P..356° F | 7.7 | 17.4 |
| 356-410° F | 83.5 | 52.0 |
| Above 410° F | 8.8 | 30.6 |
| Total | 100.0 | 100.0 |

[1] Barrels of liquid per day (24 hours).

It can be seen that the operating conditions, with the exception of the temperature, were substantially identical. However, the yields of propylene tetramer based on propylene charged and propylene converted were considerably larger in the run made at 300° than in the run made at 399°.

Thus it can be seen that higher yields are obtained at comparable conditions at 300° than are obtained at 399° F.

The two different tetramer fractions were used as alkylating agents for the alkylation of toluene using sulfuric acid as the catalyst. The reaction temperature was 350° F., the space time was 20 minutes, the hydrocarbon to acid volumetric ratio was 3, and the aromatic to olefin molal ratio was 10. The resulting alkylates were distilled and the material boiling from 530° F. to 620° F. was monosulfonated and neutralized with sodium hydroxide. The detergencies were then determined and were found to be 73 and 84 for the detergents made from the tetramer produced at 300° and 399° F. respectively. Detergency, as here used, is the increase in reflectance of standard soiled cotton cloth washed in three 0.25% detergent solutions of varying builder contents, divided by the corresponding figures for sodium lauryl sulfate, expressed as percent and averaged. Thus is can be seen that the use of the tetramer produced at the low temperature resulted in a detergent of substantially poorer quality than the detergent made from the tetramer produced at the higher temperature.

*Example II*

A portion of the tetramer produced in run 1 of Example I was passed over a calcined composite of phosphoric acid and kieselguhr at a temperature of 400° F. a liquid hourly space velocity of 1.0 and a pressure of 200 pounds per square inch. The product was then used to alkylate toluene at the conditions enumerated in Example I and the resulting alkylate was sulfonated and neutralized with sodium hydroxide. The detergency of this material was 83. Thus is can be seen that propylene tetramer can be made under conditions that result in maximum yield and can then be subjected to a treating operation whereby its effectiveness as a detergent alkylating agent is substantially enhanced.

I claim as my invention:

1. A process which comprises subjecting a mixture of propylene and a propylene polymer fraction, the components of which contain less than about 12 carbon atoms per molecule, to the action of a solid phosphorus-containing polymerization catalyst at a temperature of from about 250° F. to about 350° F. and a pressure of from about 100 to about 2,000 pounds per square inch, said mixture containing less than about 0.035 mol percent water, recovering from the resultant product a propylene tetramer fraction, contacting the last-named fraction with a phosphorus-containing polymerization catalyst at a temperature of from about 350° F. to about 500° F. and a pressure at least equal to atmospheric pressure, and recovering the resultant product comprising a fraction boiling in the range of from about 335° F. to about 435° F.

2. A process which comprises subjecting a mixture of propylene and a recycle fraction, produced as hereinafter described, to polymerization in the presence of a solid phosphorus-containing polymerization catalyst at a temperature of from about 250° F. to about 350° F. and a pressure of from about 100 to about 2,000 pounds per square inch, said mixture containing less than about 0.035 mol percent water, fractionally distilling the resultant product to separate a propylene tetramer fraction boiling from about 335° F. to about 435° F. and a lighter polymer fraction, the components of which contain less than about 12 carbon atoms per molecule, recycling said lighter polymer fraction to the aforementioned polymerization step, contacting the 335–435° F. fraction with a phosphorus-containing polymerization catalyst at a temperature of from about 350° F. to about 500° F. and a pressure at least equal to atmospheric pressure, and recovering the treated propylene tetramer fraction still boiling in the range of from about 335 to 435° F.

3. A process which comprises subjecting a mixture of propylene and a recycle fraction, produced as hereinafter described, to polymerization in the presence of a solid phosphorus-containing polymerization catalyst at a temperature of from about 250° F. to about 350° F., a pressure of from about 100 to 2,000 pounds per square inch and a liquid hourly space velocity based on the propylene of from about 0.1 to about 5.0, said mixture containing less than about 0.035 mol percent water, fractionally distilling the resultant product to separate a propylene tetramer fraction boiling from about 335° F. to about 435° F. and a lighter polymer fraction, the components of which contain less than about 12 carbon atoms per molecule, recycling said lighter polymer fraction to the aforementioned polymerization step and contacting the 335–435° F. fraction with a phosphorus-containing polymerization catalyst at a temperature of from about 350° F. to about 500° F., a space velocity of from about 0.1 to about 10.0, and a pressure at least equal to atmospheric pressure, and recovering the treated propylene tetramer fraction still boiling in the range of from about 335 to about 435° F.

4. A process which comprises subjecting a mixture comprising propylene and a recycle fraction, produced as hereinafter described, in a ratio of from about 0.2 to about 5.0 liquid volume of recycle per liquid volume of propylene, to polymerization in the presence of a solid phosphorus-containing polymerization catalyst at a temperature of from about 250° F. to about 350° F., a pressure of from about 100 to about 2,000 pounds per square inch, and a liquid hourly space velocity, based on the propylene, or from about 0.1 to about 5.0, said mixture containing less than about 0.035 mol percent water, fractionally distilling the resultant product to separate a propylene tetramer fraction boiling from about 335° F. to about 435° F. and a lighter polymer fraction, the components of which contain less than about 12 carbon atoms per molecule, recycling said lighter polymer fraction to the aforementioned polymerization step, contacting the 335–435° F. fraction with a phosphorus-containing polymerization catalyst at a temperature of from about 350° F. to about 500° F., a pressure at least equal to atmospheric pressure, and a liquid hourly space velocity of from about 0.1 to about 10.0, and recovering the treated propylene tetramer fraction still boiling in the range of from about 335 to about 435° F.

5. The process defined in claim 4 further characterized in that the phosphorus-containing polymerization catalyst comprises a solid precalcined composite of phosphoric acid and a siliceous adsorbent.

6. The process defined in claim 4 further characterized in that the phosphorus-containing polymerization catalyst comprises a solid precalcined composite of phosphoric acid and kieselguhr.

7. The process defined in claim 4 further characterized in that the phosphorus-containing polymerization catalyst comprises an alkaline earth phosphate.

8. In the manufacture of surface active agents wherein an aromatic compound is alkylated with a propylene tetramer fraction, the alkylate sulfonated and the resultant sulfonic acid neutralized to form an alkyl aryl sulfonate, the process for producing said propylene tetramer fraction and for increasing the effectiveness of the propylene tetramer as a component of the surface active agent, which comprises subjecting a mixture of propylene and a propylene polymer fraction, the components of which contain less than about 12 carbon atoms per molecule, to the action of a solid phosphorus-containing polymerization catalyst at a temperature of from about 250° F. to about 350° F. and a pressure of from about 100 to about 2000 pounds per square inch, said mixture containing less than about 0.035 mol percent water, recovering from the resultant product a propylene tetramer fraction, contacting the last-named fraction with a phosphorus-containing polymerization catalyst at a temperature of from about 350° F. to about 500° F. and a pressure at least equal to atmospheric pressure, and recovering the resultant product comprising a fraction boiling in the range of from about 335° F. to about 435° F.

9. In the manufacture of surface active agents wherein an aromatic compound is alkylated with a propylene tetramer fraction, the alkylate sulfonated and the resultant sulfonic acid neutralized to form an alkyl aryl sulfonate, the process for producing said propylene tetramer fraction and for increasing the effectiveness of the propylene tetramer as a component of the surface active agent, which comprises subjecting a mixture of propylene and a recycle fraction, produced as hereinafter described, to polymerization in the presence of a solid phosphorus-containing polymerization catalyst at a temperature of from about 250° F. to about 350° F., a pressure of from about 100 to 2000 pounds per square inch and a liquid hourly space velocity based on the propylene of from about 0.1 to about 5.0, said mixture containing less than about 0.035 mol percent water, fractionally distilling the resultant product to separate a propylene tetramer fraction boiling from about 335° F. to about 435° F. and a lighter polymer fraction, the components of which contain less than about 12 carbon atoms per molecule, recycling said lighter polymer fraction to the aforementioned polymerization step and contacting the 335–435° F. fraction with a phosphorus-containing polymerization catalyst at a temperature of from about 350° F. to about 500° F., a space velocity of from about 0.1 to about 10.0, and a pressure at least equal to atmospheric pressure, and recovering the treated propylene tetramer fraction still boiling in the range of from about 335 to about 435° F.

RAYMOND E. SCHAAD.

REFERENCES CITED

The following references are of record in the file of this patent:

UNITED STATES PATENTS

| Number | Name | Date |
|---|---|---|
| 2,143,566 | Moser | Jan. 10, 1939 |
| 2,232,117 | Kyrides | Feb. 18, 1941 |
| 2,233,408 | Flett | Mar. 4, 1941 |
| 2,283,199 | Flett | Mar. 19, 1942 |
| 2,318,719 | Schneider et al. | May 11, 1943 |
| 2,332,298 | Clarke et al. | Oct. 19, 1943 |
| 2,413,161 | Zerner | Dec. 24, 1946 |
| 2,457,146 | Grote et al. | Dec. 28, 1948 |